US010919456B2

(12) United States Patent
Hélot

(10) Patent No.: US 10,919,456 B2
(45) Date of Patent: Feb. 16, 2021

(54) DISPLAY APPARATUS FOR A MOTOR VEHICLE, METHOD FOR OPERATING A DISPLAY APPARATUS, AND MOTOR VEHICLE HAVING A DISPLAY APPARATUS

(71) Applicant: AUDI AG, Ingolstadt (DE)

(72) Inventor: Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 580 days.

(21) Appl. No.: 15/567,333

(22) PCT Filed: Apr. 21, 2016

(86) PCT No.: PCT/EP2016/000643
§ 371 (c)(1),
(2) Date: Oct. 17, 2017

(87) PCT Pub. No.: WO2016/173699
PCT Pub. Date: Nov. 3, 2016

(65) Prior Publication Data
US 2018/0134232 A1    May 17, 2018

(30) Foreign Application Priority Data
Apr. 25, 2015   (DE) .................. 10 2015 005 365

(51) Int. Cl.
*B60R 11/02*    (2006.01)
*B60K 37/02*    (2006.01)
*B60K 35/00*    (2006.01)
*B60K 37/04*    (2006.01)

(52) U.S. Cl.
CPC .......... *B60R 11/0229* (2013.01); *B60K 35/00* (2013.01); *B60K 37/02* (2013.01); *B60K 37/04* (2013.01); *B60K 2370/154* (2019.05); *B60K 2370/1523* (2019.05); *B60K 2370/1533* (2019.05); *B60K 2370/182* (2019.05); *B60K 2370/67* (2019.05); *B60K 2370/736* (2019.05); *B60K 2370/744* (2019.05)

(58) Field of Classification Search
CPC combination set(s) only.
See application file for complete search history.

(56) References Cited

U.S. PATENT DOCUMENTS

| 2005/0040941 | A1* | 2/2005 | Schofield | ............ B60C 23/0401 |
| | | | | 340/442 |
| 2008/0211652 | A1* | 9/2008 | Cope | ...................... B60K 35/00 |
| | | | | 340/461 |
| 2015/0002991 | A1* | 1/2015 | Vander Sluis | ............ B60R 7/04 |
| | | | | 361/679.01 |

FOREIGN PATENT DOCUMENTS

| CN | 203580658 | 5/2014 |
| CN | 104249622 | 12/2014 |
| CN | 104369697 | 2/2015 |
| DE | 101 15 050 A1 | 10/2002 |

(Continued)

OTHER PUBLICATIONS

Office Action dated Apr. 2, 2019 in corresponding Chinese Patent Application No. 201680023830.3 (8 pages).

(Continued)

*Primary Examiner* — William C Vaughn, Jr.
*Assistant Examiner* — Naod W Belai
(74) *Attorney, Agent, or Firm* — Staas & Halsey LLP

(57) ABSTRACT

A flexible display device, providing an instrument cluster for a motor vehicle, is repositioned by a repositioning device from a stowed position into a use position by bending the display device.

13 Claims, 2 Drawing Sheets

(56) References Cited

FOREIGN PATENT DOCUMENTS

| | | |
|---|---|---|
| DE | 10 2005 038 485 A1 | 2/2007 |
| DE | 10 2005 049 127 | 4/2007 |
| DE | 10 2008 023 469 A1 | 12/2009 |
| DE | 10 2009 040 965 A1 | 3/2011 |
| DE | 10 2010 056 411 A1 | 6/2012 |
| DE | 10 2014 009 609 A1 | 12/2014 |
| DE | 102015005365.5 | 4/2015 |
| DE | 10 2014 006 338 A1 | 11/2015 |
| EP | 1 637 387 A1 | 3/2006 |
| FR | 2 861 657 | 5/2005 |
| FR | 2 861 657 A1 | 5/2005 |
| KR | 10-2013-0117110 A1 | 10/2013 |
| WO | 2011/062583 A1 | 5/2011 |
| WO | PCT/EP2016/000643 | 4/2016 |

OTHER PUBLICATIONS

International Search Report for PCT/EP2016/000643 dated Aug. 23, 2016.
German Office Action for Application No. 102015005365.5 dated Apr. 15, 2016.
Ron Mertens, "OLED-info"; printed from www.oled-info.com/ore-details-oled-prototypes-used-audis-prologue-concept-car on Apr. 15, 2016; pp. 1-2.
English Translation by WIPO of the International Preliminary Report on Patentability dated Nov. 9, 2017 in corresponding International Patent Application No. PCT/EP2016/000643.

\* cited by examiner

DISPLAY APPARATUS FOR A MOTOR VEHICLE, METHOD FOR OPERATING A DISPLAY APPARATUS, AND MOTOR VEHICLE HAVING A DISPLAY APPARATUS

CROSS REFERENCE TO RELATED APPLICATIONS

This application is the U.S. national stage of International Application No. PCT/EP2016/000643, filed Apr. 21, 2016 and claims the benefit thereof. The International Application claims the benefit of German Application No. 10 2015 005 365.5 filed on Apr. 25, 2015, both applications are incorporated by reference herein in their entirety.

BACKGROUND

Described below are a display apparatus for a motor vehicle and a method for operating a display apparatus of the type specified in the preambles of the independent patent claims, as well as a motor vehicle having such a display apparatus.

Displays for displaying information items are arranged in the instrument panel, or else in the center console, in more and more motor vehicles. Here, the amount of information displayed increases. Often, this leads to relatively large displays, particularly if graphical user interfaces with many elements have to be displayed. Use is also increasingly made of instrument clusters that are embodied as displays in order to display as many information items as possible and different information items to a driver. Here, an instrument cluster, particularly if it has a particularly large embodiment, may detract the driver from the traffic situation in some situations.

DE 101 15 050 A1 discloses a display apparatus for a motor vehicle, having a flexible display device and a repositioning device, wherein the repositioning device is embodied to reposition the display device from a stowed position into a use position. Here, the repositioning device includes a pinion gear drive, by which the flexible display device can be driven out like a roller blind from a non-visible stowed position arranged in a receptacle region to a use position that is visible to a vehicle occupant.

WO 2011/062583 A1 shows a flexible display with a roller-blind-like embodiment, which can likewise be repositioned from a stowed position into a use position.

KR 20130117110 A discloses a curved display, wherein the curvature of the display can be adapted depending on the situation. Depending on the respective positions of observers, who are looking at the display, the curvature of the display is adapted in such a way that all persons can look at the display with a particularly expedient viewing angle.

SUMMARY

Described below are a display apparatus for a motor vehicle and a method for operating a display apparatus, by which content can be displayed to a driver of a motor vehicle in a particularly adequate manner.

The display apparatus for a motor vehicle includes a flexible display device and a repositioning device which is embodied to reposition the display device from a stowed position into a use position. Here, the display apparatus is distinguished by virtue of the repositioning device being embodied to bend the display device from the stowed position into the use position, wherein the display device is an instrument cluster for a motor vehicle.

As a consequence, the display apparatus described herein can replace a known instrument cluster, which is embodied e.g. as a rigid and non-repositionable display, in a motor vehicle. Thus, the display device of the display apparatus, which is embodied as an instrument cluster, can be either bent away into the stowed position or bent up into the use position when required. In the bent-away stowed position, the driver can concentrate particularly well on the traffic situation since the flexible display device is no longer situated in the field of view of the driver. Should the driver, in turn, desire to have information displayed to them by the flexible display device, the latter can easily be bent up again from the stowed position into the use position such that the driver can read the content relevant to them from the display device that is embodied as an instrument cluster in a simple and comfortable manner. By way of example, it may be advantageous in the case of nighttime driving if the flexible display device is repositioned into the bent-down stowed position by the repositioning device. When in the stowed position, the brightness of the display device no longer bothers the driver and so they can see the dark surroundings particularly well. Here, the display apparatus may be embodied in such a way that the display device is deactivated as soon as the latter has been repositioned in the stowed position. As a consequence, unnecessary light emissions from the display device are prevented in the stowed position, wherein the power consumption of the display device can also be reduced thereby.

In an advantageous configuration, provision is made for the display apparatus to have a pivotable scoop arranged over the display device in the vehicle vertical direction, wherein the repositioning device is embodied to reposition the scoop up and down between a position that covers the display device and a position that uncovers the display device in a manner corresponding to the repositioning of the display device. Expressed differently, the display apparatus thus is embodied in such a way that, when the display apparatus is installed as intended, the scoop is arranged above the flexible display device in the vehicle vertical direction. Here, the repositioning of the scoop and the repositioning of the display device are coupled to one another. If the display device is moved from the stowed position to the use position, the scoop, in a manner corresponding thereto, is repositioned from the position that covers the display device into the position that uncovers the display device. Conversely, as soon as the display device is moved from the use position into the stowed position, the scoop is pivoted, in a manner corresponding thereto, from the position that uncovers the display device into the position that covers the display device.

The repositioning device may have a single motor for repositioning the display device and the scoop. As a consequence, a synchronization of the movements of the scoop and of the display device can be effectuated in a particularly simple manner. However, alternatively, it is also possible for the repositioning device to have e.g. two motors, wherein the display device is repositionable by one motor and the scoop is repositionable by the other motor. In this case, the actuation of the two motors is synchronized in such a way that the repositioning of the display device and of the scoop is always effectuated in a coupled manner. The scoop is accompanied by the advantage of, firstly, the driver being able to read the display device embodied as an instrument cluster in the use position without being blinded. Moreover, it is possible, by the pivotable scoop, to completely cover the display device bent into the stowed position. As a result, the display device is firstly protected in the stowed position from external influences, for example exposure to dust and the like. Secondly, the scoop can shield the display device in an opaque manner in the stowed position such that light that may possibly still be emitted by the display device does not reach the eye of the driver of the motor vehicle such that they can observe the vehicle surroundings, in particular through the windshield, particularly without interference.

A further advantageous embodiment provides for the repositioning device to be embodied to reposition the scoop and the display device into a partly erected position, wherein the display device is embodied to display a reduced content in the partly erected position in comparison with the use position. In the partly erected position, the display device has a flatter angle of inclination than in the position that is bent completely into the use position. Therefore, the display device in the partly erected position may be actuated in such a way that the content displayed by the display device is displayed with such stretching that the driver can see the displayed content as displayed when the display device is in the completely erected position, i.e. the position bent into the stowed position. Thus, if the driver wishes to have less information displayed to them by the display device, the display device can be bent or moved together with the scoop into the partly erected position such that the driver has a particularly free view through the windshield over the top of the scoop and, moreover, still can have displayed to them the reduced content by the display device at the same time.

According to a further advantageous embodiment, provision is made for the display apparatus to have a display, in particular a ribbon-shaped display, that is arranged behind the display device in the vehicle longitudinal direction, the display being embodied to display at least some of the information that is displayable by the display device. The ably ribbon-shaped display can be arranged, for example, below a windshield on an instrument panel support of the motor vehicle. When the scoop is folded down and, as a consequence, when the display device is bent downward into the stowed position, the driver can thus have displayed to them some content, such as reduced content, by a ribbon-shaped display, which content was previously still displayed by the display device. Thus, even if the display device is bent down into the stowed position, the driver can still have displayed to them content that is relevant to them, with the driver having a particularly good view through the windshield on account of the folded-down scoop and the bent-down display device. Alternatively, or additionally, provision can also be made for the scoop to have a display, with this display likewise being embodied to display at least some of the information which is displayable by the display device. In the case of a partly or completely folded-down scoop, the driver can thus simply still see information on the display arranged on the scoop, which information was previously displayed by the display device.

A further advantageous embodiment provides for the display apparatus to have an operating element for manual actuation of the repositioning device. By way of example, the operating element can be a button or the like, wherein the display apparatus can be bent to and fro between the stowed position and the use position by actuating the operating element. In a manner corresponding thereto, the scoop may then also moved to and fro in a corresponding manner between the position that covers the display device and the position that uncovers the display device. Thus, the driver can manually actuate the repositioning device in order to let the display device be bent up into the use position or bent down into the stowed position.

In a further advantageous configuration, provision is made for the repositioning device to have a pivotable lever mechanism which is embodied to bend the display device from the stowed position into the use position. The pivotable lever mechanism allows the display device to be bent from the stowed position into the use position and back again in a particularly simple manner. The lever mechanism may have at least one lever which is pivotably mounted with one end region in a component of the display apparatus that differs from the display device and mounted with an opposite end region on a linear guide fastened to the display device. As a result, the flexible display device can be bent to and fro between the stowed position and the use position in a particularly simple and reliable manner. The linear guide facilitates particularly exact guiding of the lever along the display device. As a result, the display device can be bent particularly exactly and reliably from the stowed position into the use position and also back into the stowed position again.

In a further advantageous configuration, provision is made for the display device to have a display layer having organic light-emitting diodes. Thus, the display layer may be an OLED layer. In the active state, such OLED layers can be bent like a plastic film. Thus, in general, the display device can be an OLED display. In order to protect the display layer having the organic light-emitting diodes from external influences, provision can moreover be made for a transparent capping layer still to be arranged on the outer side on the display layer. Here, the transparent capping layer likewise has a flexible embodiment and may be produced, for example, from Plexiglas or a bendable glass. The capping layer may also have a partly transparent embodiment and have a tint. Using a tint, it is possible, for example, to optically mask an adhesion agent layer, also referred to as primer layer, which is attached below the capping layer. The capping layer, moreover, may have an antireflection surface or a corresponding antireflection coating. This contributes to the display device being particularly easy to read, even in the bent state.

Thus, the display device may have a plurality of layers arranged over one another, such as e.g. the display layer having the organic light-emitting diodes and the transparent capping layer. Here, only the capping layer may be fastened in a first region of the display device to a component that differs from the display device, with all layers of the display device being connected to one another at a free end region of the display device, arranged opposite to the first end region, by a clamping device. One or more layers arranged below the capping layer thus are able to move in a translational manner in relation to the capping layer when the display device is bent open from the stowed position into the use position. This is because the layers arranged below one another are bent to a different extent when bending open the flexible display device, wherein, on account of the relative mobility of the layers in relation to one another, the layers can be displaced relative to one another when bending open the display device into the use position. As a result of this degree of freedom, it is possible to avoid unwanted and possibly damaging stresses within the individual layers, as a consequence of which wave-shaped unevenness may possibly occur in the layers. Electrostatic charging of the individual layers could result from the relative translational mobility. As a consequence, the layers could attract one another locally, leading to an unwanted formation of bulges. This would, inter alia, have a negative effect on the optical appearance. It is for this reason that an antistatic coating may be applied to those layers which can move relative to one another in a translational manner.

A carrier layer may be arranged under the display layer, the carrier layer exerting a force directed in the direction of the capping layer onto the display layer and the carrier layer being at least relatively movable in relation to the capping layer in respect of the first end. By way of example, the carrier layer can be embodied as a type of spring element, for example in the form of leaf spring or the like. Thus, the other layers are pressed against the capping layer by the carrier layer such that the individual layers remain contiguously in contact with one another. Expressed differently, the carrier layer ensures the cohesion of the individual layers of the display device.

A motor vehicle may include an embodiment of the display apparatus described herein.

In the method for operating a display apparatus of a motor vehicle, a flexible display device of the display apparatus is moved from a stowed position into the use position by a repositioning device of the display apparatus. Here, the method is distinguished by virtue of the display device that is embodied as an instrument cluster being bent from the stowed position into the use position by the repositioning device. Here, advantageous configurations of the display apparatus should be considered to be advantageous configurations of the method, wherein the display apparatus is able to carry out the method.

In an advantageous configuration of the method, provision is made for the display device to be bent from the stowed position into the use position as soon as an ignition of the motor vehicle has been activated. Expressed differently, the display device is automatically bent from the stowed position into the use position as soon as the "terminal 15 on" state is present. The display apparatus for displaying content also may only be activated once the ignition of the motor vehicle has been activated. In the case of an activated display, the display device thus is automatically bent up from the stowed position into the use position as soon as an ignition of the motor vehicle has been activated.

Provision may be made for the display device to be bent from the use position into the stowed position as soon as an ignition of the motor vehicle has been deactivated. Expressed differently, the display device thus is bent back again into the stowed position without a vehicle occupant having to undertake an active action on the display apparatus. However, as already mentioned previously, provision may also additionally be made for the display apparatus to have an operating element for manual actuation of the repositioning device. By actuating the operating element, it is possible to cause a bending up of the display device from the stowed position into the use position and a bending down from the use position into the stowed position.

BRIEF DESCRIPTION OF THE DRAWINGS

Further advantages, features and details will become more apparent and more readily appreciated from the following description of exemplary embodiments and on the basis of the drawings. The features and feature combinations mentioned above in the description and the features and feature combinations specified below in the description of the figures and/or only shown in the figures can be used not only in the respectively specified combination, but also in other combinations or on their own, without departing from the scope of the invention.

In the drawings.

DETAILED DESCRIPTION OF THE PREFERRED EMBODIMENT

Figure 1:
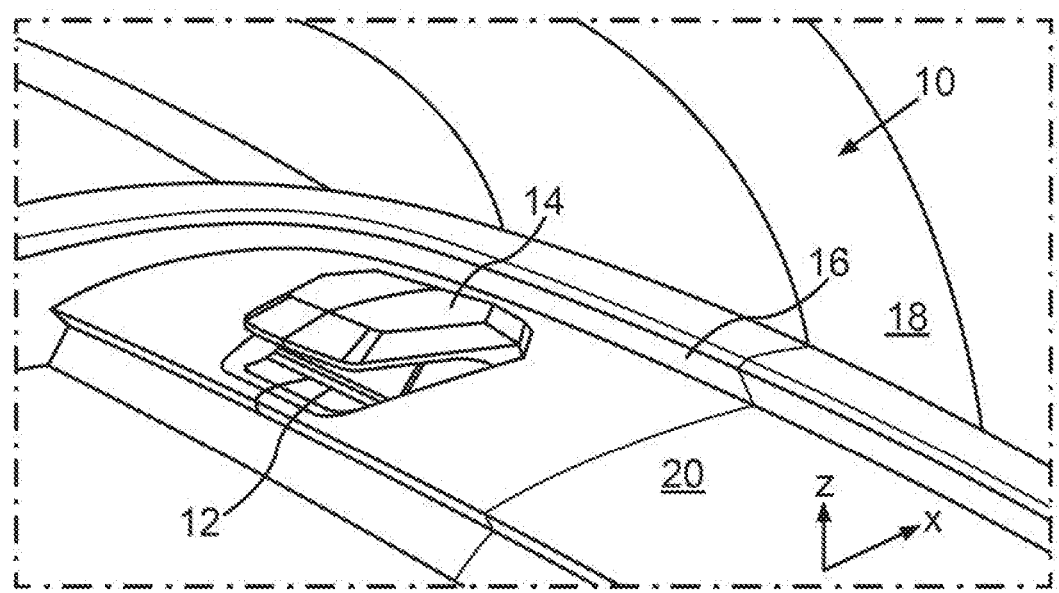
FIG. 1 is a perspective view of a partly illustrated cockpit of a motor vehicle, wherein a flexible display device, embodied as an instrument cluster, is arranged below a pivoted-up scoop.

Reference will now be made in detail to the preferred embodiments, examples of which are illustrated in the accompanying drawings. In the figures, the same or functionally equivalent elements are provided with the same reference characters.

A display apparatus, denoted by 10 overall, for a motor vehicle is shown in a perspective view in FIG. 1. The display apparatus 10 has a flexible display device 12 that is embodied as an instrument cluster and a pivotable scoop 14 that is arranged over the flexible display device 12 in the vehicle vertical direction z. The display apparatus 10 moreover has a ribbon-shaped display 16, which is arranged below a windshield 18 on an instrument panel support 20, in which the display device 12 is integrated. As may be identified, the ribbon-shaped display 16 is arranged behind the scoop 14 and behind the flexible display device 12 in the vehicle longitudinal direction x in this case. By way of example, the display device 12 that is embodied as an instrument cluster may be an OLED display. Using the display device 12, it is possible to display multifarious information items, such as e.g. speed information items, rotational speed information items, navigation instructions and the like. In the present case, the display device 12 is bent up into the use position.

Figure 2:
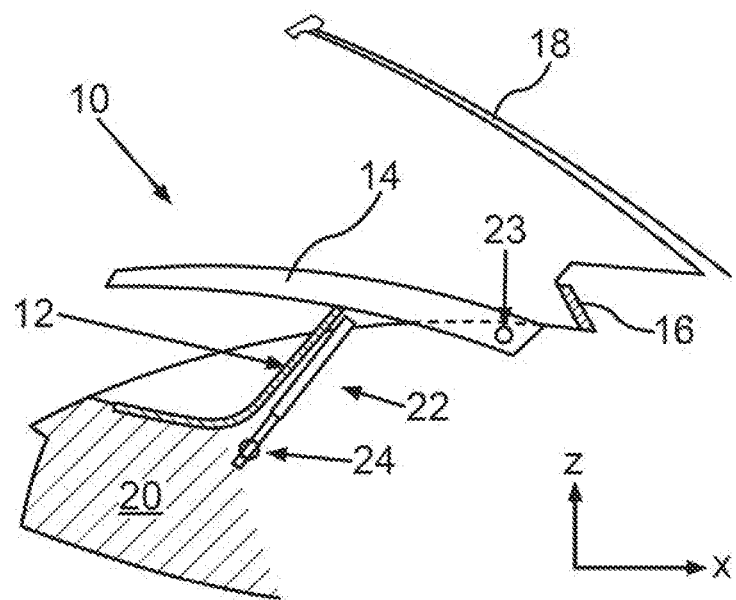
FIG. 2 is a side sectional view of the display device that has been bent into the use position, wherein a repositioning device for repositioning the display device is illustrated.

FIG. 2 shows, in a side sectional view, the display device 12 that is integrated into the instrument panel support 20. The display apparatus 10 includes a repositioning device 22 which is embodied to bend the display device 12 to and fro between the use position, shown here, and a downwardly bent stowed position. In the present case, the repositioning device 22 is embodied as a pivotable lever mechanism which can be pivoted about a hinge 24 in order to bend the flexible display device 12 upward and downward. Expressed differently, the repositioning device 22 thus can bend the flexible display device 12 upward and downward about the vehicle transverse axis y not shown here.

Here, the repositioning device 22 is embodied to reposition the scoop 14 up and down, in a manner corresponding to the repositioning of the display device 12, between a position that covers the display device 12 and, as illustrated here, a position that uncovers the display device 12. Here, the scoop 14 is pivotably mounted about a hinge 23. Expressed differently, the repositioning device 22 is embodied in such a way that the movement of the scoop 14 and the movement of the display device 12 are coupled to one another. The repositioning device 22 may have a single motor for repositioning both the display device 12 and the scoop 14. Thus, the flexible display device 12 precisely does not push the scoop 14 upward. Instead, the scoop 14 is moved by the repositioning device 22 in such a way that no forces act on the flexible display device 12 from the scoop 14. Here, it is also possible for the repositioning device 22 to have two motors, wherein the respective motors respectively ensure that the scoop 14 and the flexible display device 12 are moved in a manner coupled to one another.

Moreover, the repositioning device 22 is embodied to reposition the scoop 14 and the display device 12 into a partly erected position, wherein the display device 12 is embodied to display a reduced content in the partly erected position in comparison with the completely upwardly bent use position shown here. Thus, in the partly erected position, the scoop 14 only uncovers a narrower region, through which the driver can direct their view on the display device 12. Here, it is nevertheless still possible as a result of the reduced display of content that the driver can read certain content from the display device 12.

Figure 3:
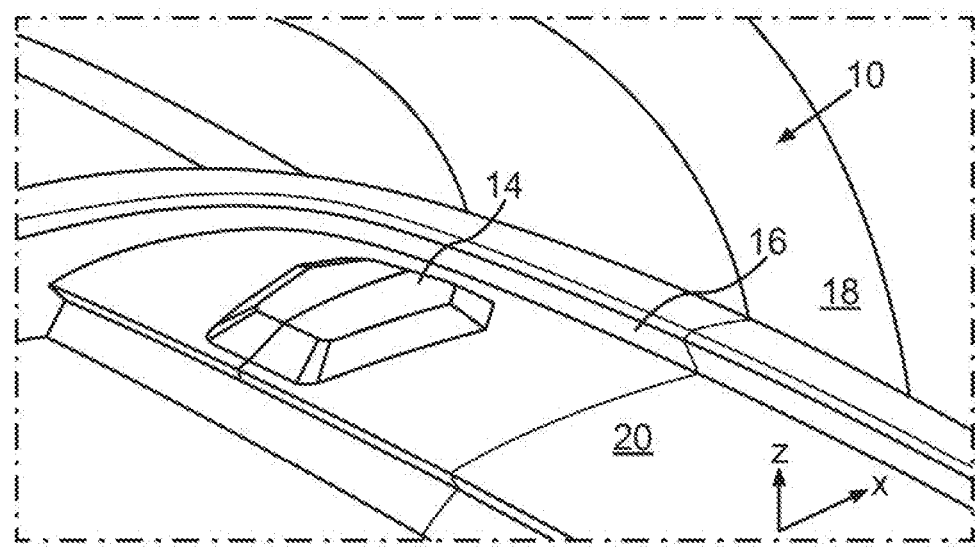
FIG. 3 is a further perspective view of the partly illustrated cockpit, wherein the display device has been bent down from the bent-up use position into the stowed position and has been covered by the scoop that has been pivoted downward.

In FIG. 3, the scoop is shown in its folded-down position that covers the display device 12. Should the driver desire to have an improved view through the windshield 18, they can actuate, for example, an operating element (not shown here) in the form of a button or the like, as a consequence of which the repositioning device 22 is actuated in such a way that the display device 12 is bent down into the lowered stowed position. At the same time, the repositioning device 22 moves the scoop 14 into the folded-down position that covers the display device 12, as shown here.

As soon as the display device 12 has been bent into the lowered stowed position and the scoop 14 covers the bent-down display device 12, provision can be made for the display apparatus 10 to be operated in such a way that a reduced content, which, otherwise, is usually displayed by the display device 12 that serves as an instrument cluster, is displayed by the ribbon-shaped display 16. By way of example, it is also possible to display, in a reduced form, information in respect of the current speed of the motor vehicle, simplified navigation instructions by arrow symbols and the like on the ribbon-shaped display 16. Thus, if the scoop 14 is folded down, the driver thus has an unimpeded view through the windshield 18 and can still, in the process, read information that is relevant to them from the ribbon-shaped display 16. Alternatively, or additionally, provision can also be made for the scoop 14 to have a display (not illustrated here) on the upper side thereof, by which display content may be displayed additionally or alternatively, which content was previously displayed by the display device 12 that serves as an instrument cluster. Expressed differently, the display apparatus 10 thus still can display information that is relevant to the driver using the display that is arranged on the scoop 14 and not illustrated here when the display device 12 is bent down and the display device 12 is covered by the scoop 14.

Figure 4:
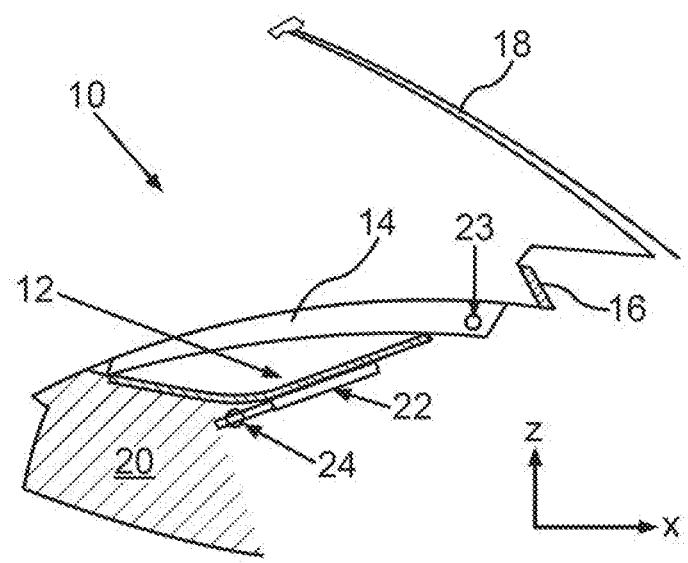
FIG. 4 is a side sectional view in which the display device, which is been bent down into the stowed position, and the scoop, which has been pivoted downward, are shown.

FIG. 4 shows the bent-down display device 12 and the folded-down scoop 14 in a side sectional view. As may be identified, the flexible display device 12 and the repositioning device 22 are arranged and embodied in such a way that the flexible display device 12 can be bent down into the stowed position, shown here, in such a way that the scoop 14 can be pivoted so far down that it terminates substantially flush with the instrument panel support 20 and covers the view of the display device 12 bent into the stowed position. Depending on the installation space situation, the scoop 14 may also be arranged and embodied here in such a way that it is integrated completely flush into the instrument panel support 20 in the pivoted-down position.

The display device 12 may be moved from the recessed stowed position into the bent-up use position as soon as the ignition of the motor vehicle has been activated. Expressed differently, as soon as the ignition of the motor vehicle is activated, the display device 12 thus is moved automatically with the activation of the ignition from the recessed stowed position into the upwardly bent use position. Corresponding therewith, the scoop 14 then is pivoted up as well in a synchronous manner. As soon as the ignition of the motor vehicle is deactivated, the display device 12 is bent down into the stowed position again, wherein, coupled to this movement, the scoop 14 is likewise pivoted downward again such that the display device 12 is covered by the scoop 14. However, as already mentioned, the driver can also cause upward bending and downward bending of the display device 12 by way of an appropriate actuation of an operating element, and so they themselves can decide whether they would like to have displayed a corresponding content with the display device 12 serving as an instrument cluster at this time or, instead, would rather have the flexible display device 12 recessed in the stowed position such that they have an unimpeded view through the windshield 18.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A display apparatus for a motor vehicle, comprising: a flexible display device including an instrument cluster of the motor vehicle;
   a pivotable lever mechanism configured to reposition the flexible display device from a stowed position into a use position by bending the flexible display device from the stowed position into the use position; and
   a ribbon-shaped display, disposed behind the flexible display device in a vehicle longitudinal direction, configured to display at least some of content displayable by the flexible display device.

2. The display apparatus as claimed in claim 1, further comprising a pivotable scoop having a first position covering the flexible display device in a vehicle vertical direction when the flexible display device is in the stowed position, and wherein the repositioning device is configured to reposition the scoop up and down between the first position covering the flexible display device and a second position revealing the flexible display device when the flexible display device is in the use position.

3. The display apparatus as claimed in claim 2, wherein the repositioning device is configured to reposition the scoop and the flexible display device into a partly erected position, and wherein the flexible display device is configured to display reduced content in the partly erected position in comparison to content of the instrument cluster displayed in the use position.

4. The display apparatus as claimed in claim 1, further comprising an operating element configured to manually actuate the repositioning device.

5. The display apparatus as claimed in claim 1, wherein the flexible display device includes a display layer having organic light-emitting diodes.

6. A motor vehicle, comprising:
a chassis; and
a display apparatus including a flexible display device including an instrument cluster of the motor vehicle;
a repositioning device pivotable lever mechanism configured to reposition the flexible display device from a stowed position into a use position by bending the flexible display device from the stowed position into the use position; and
a ribbon-shaped display, disposed behind the flexible display device in a vehicle longitudinal direction, configured to display at least some of content displayable by the flexible display device.

7. The motor vehicle as claimed in claim 6, wherein the flexible display device further includes a pivotable scoop having a first position covering the flexible display device in a vehicle vertical direction when the flexible display device is in the stowed position, and wherein the repositioning device is configured to reposition the scoop up and down between the first position covering the flexible display device and a second position revealing the flexible display device when the flexible display device is in the use position.

8. The motor vehicle as claimed in claim 7, wherein the repositioning device is configured to reposition the scoop and the flexible display device into a partly erected position, and wherein the flexible display device is configured to display reduced content in the partly erected position in comparison to content of the instrument cluster displayed in the use position.

9. The motor vehicle as claimed in claim 6, wherein the flexible display device further includes an operating element configured to manually actuate the repositioning device.

10. The motor vehicle as claimed in claim 6, wherein the flexible display device further includes a display layer having organic light-emitting diodes.

11. A method for operating a display apparatus of a motor vehicle, comprising:
moving a flexible display device of the display apparatus from a stowed position into a use position by a repositioning device bending the flexible display device, the flexible display device including an instrument cluster;
repositioning a pivotable scoop between a first position, covering the flexible display device in a vehicle vertical direction when the flexible display device is in the stowed position, and a second position revealing the flexible display device when the flexible display device is in the use position;
stopping, when a control signal is received, said repositioning of the pivotable scoop at a partially erect position between the stowed position and the use position; and
displaying reduced content in the partly erected position in comparison to content of the instrument cluster displayed in the use position.

12. The method as claimed in claim 11, further comprising displaying at least some of content displayable by the flexible display device on a ribbon-shaped display disposed behind the flexible display device in a vehicle longitudinal direction.

13. The method as claimed in claim 11, wherein said moving includes manual actuation of the repositioning device by a pivotable lever mechanism configured to bend the display device from the stowed position into the use position.

* * * * *